Nov. 18, 1952   M. T. HEDQUIST ET AL   2,618,212
TRACTOR HITCHED PLOW

Filed July 19, 1944   6 Sheets-Sheet 1

INVENTOR.
MILTON T. HEDQUIST
DAVID D. MAYHEW
BY   ACHIEL VAN DE SAMPEL
ARTHUR L. WHALEN
William F. R. Buckley
ATTORNEY

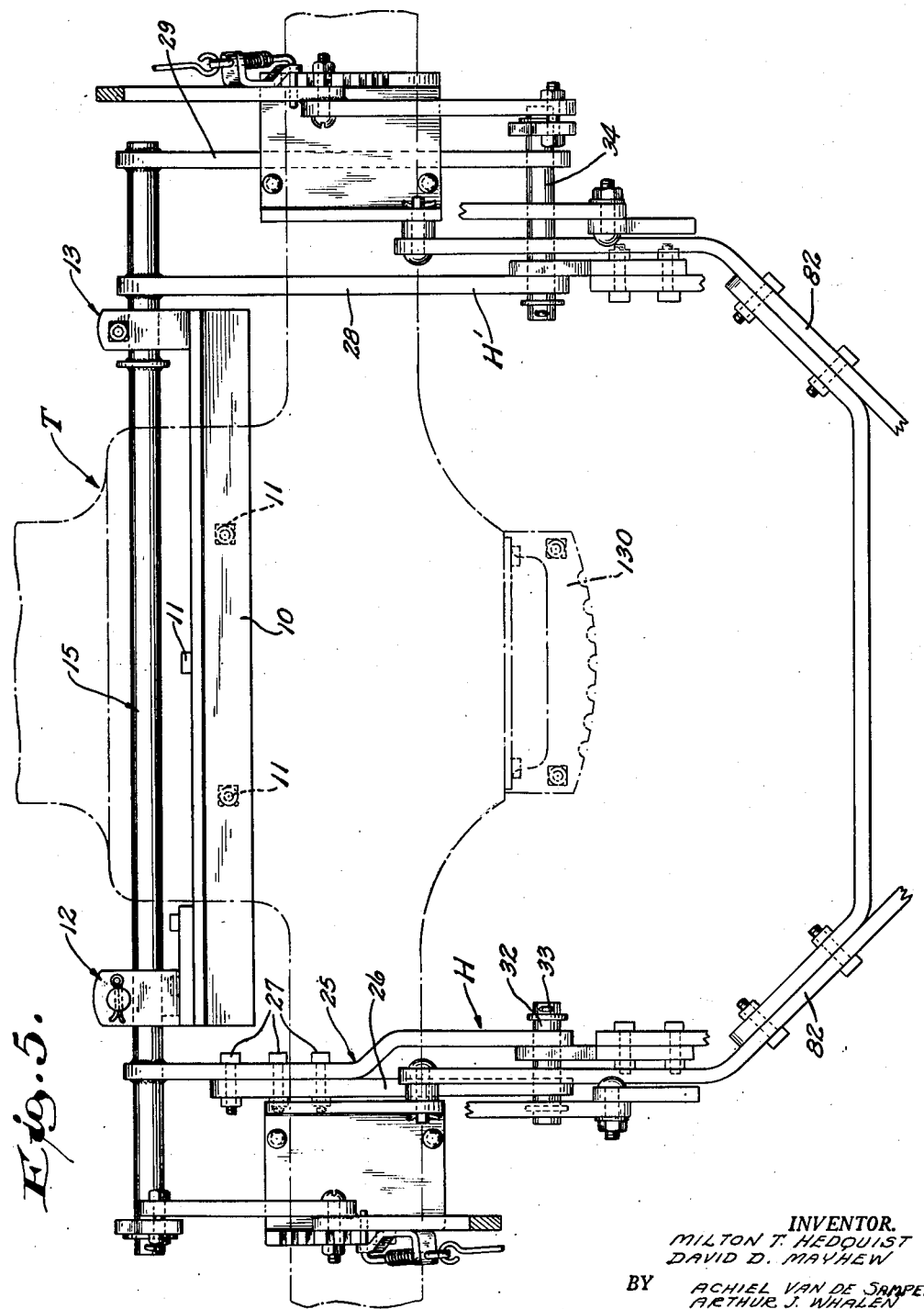

Nov. 18, 1952 — M. T. HEDQUIST ET AL — 2,618,212
TRACTOR HITCHED PLOW
Filed July 19, 1944 — 6 Sheets-Sheet 5
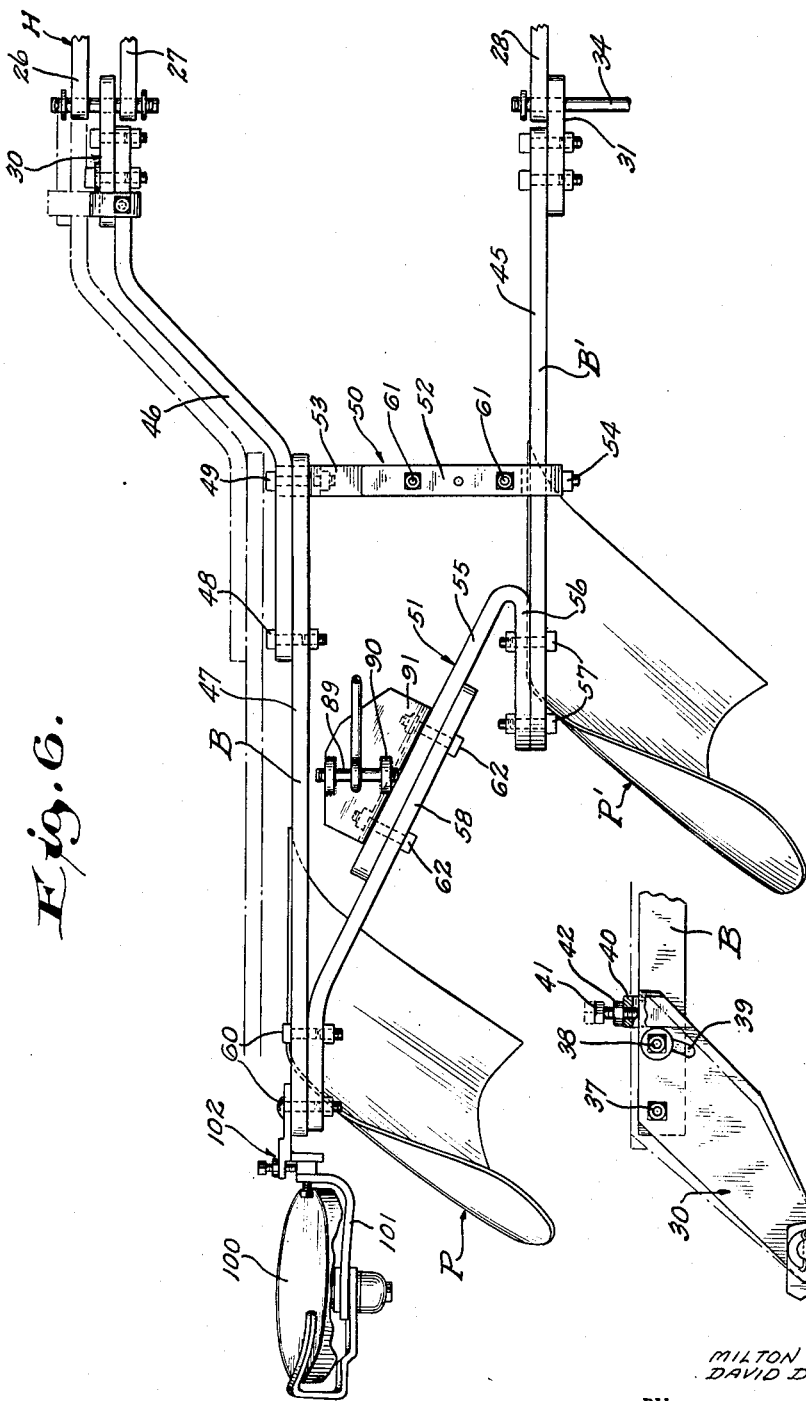
INVENTOR.
MILTON T. HEDQUIST
DAVID D. MAYHEW
BY ACHEIL VE V DE SAMPEL
ARTHUR J. WHALEN
William F. Buckley
ATTORNEY.

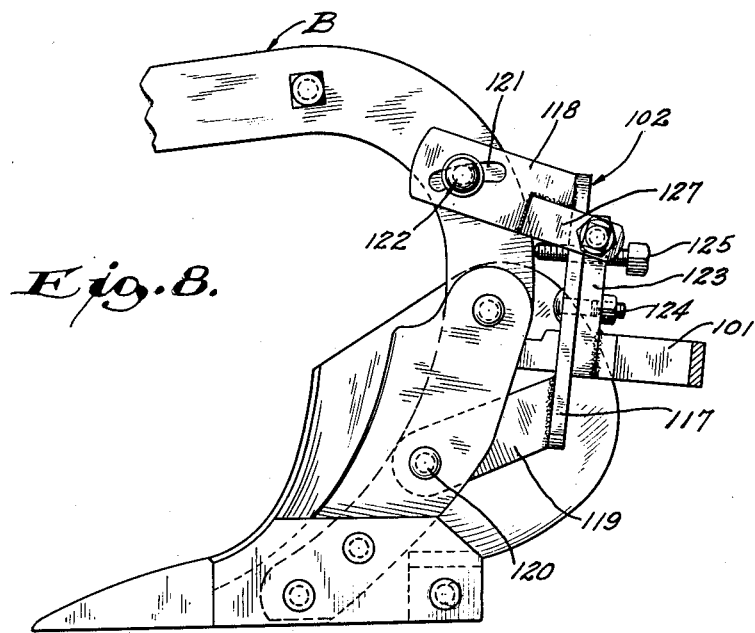
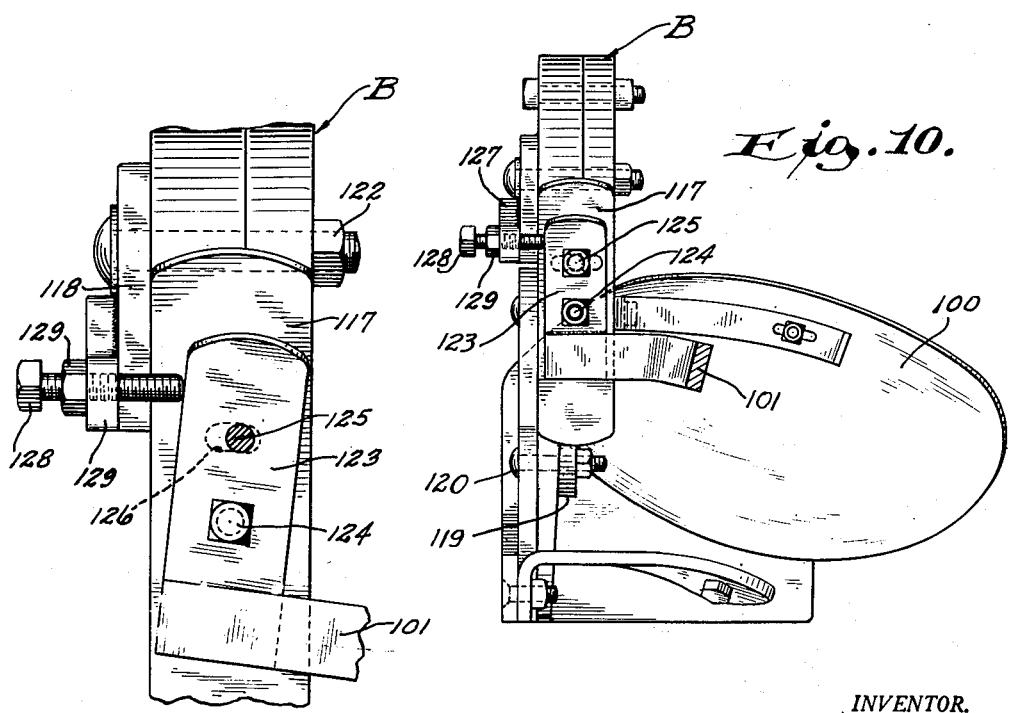

Patented Nov. 18, 1952

2,618,212

UNITED STATES PATENT OFFICE 2,618,212

TRACTOR HITCHED PLOW

Milton T. Hedquist, David D. Mayhew, Achiel Van De Sampel, and Arthur J. Whalen, Rock Island, Ill., assignors to J. I. Case Company, Racine, Wis., a corporation of Wisconsin Application July 19, 1944, Serial No. 545,648

6 Claims. (Cl. 97—47)

1

This invention relates to a tractor hitched plow of the type which is manually controllable as to depth of plowing, as to level, and as to lift.

An object of the invention is to provide a plow of this character which is so constructed and organized that its various adjustments are facilitated, so much so that they may be made conveniently by a single operator of the plow or plows. The control of the depth at which the plow or plows operate is regulated by a single hand lever. Correction or compensation incident to the fact that one wheel of the tractor rides in a furrow, while the other rides on unplowed ground is also under the control of a single lever. The lift mechanism is largely conventional and power operated, but it is combined in a special way with a bracing structure interconnecting the beams of the plows where at least two plows are employed.

Another object of the invention is to provide a tractor hitched plow of the character described which may be readily and economically fabricated from available materials, yet is simple in construction, compact and close in its organization, highly efficient in operation, and, as indicated, readily and easily controlled.

These objects of the invention and other ancillary advantages are attained by the mechanism, construction, and arrangement illustrated in the accompanying drawings forming part hereof, in which:

Fig. 5 is a view taken on line 5—5 of Fig. 1 to illustrate the lift mechanism overlying the plow beams and their hitches, and also illustrating, to some extent, the construction of the hitches;

2

Figure 1:
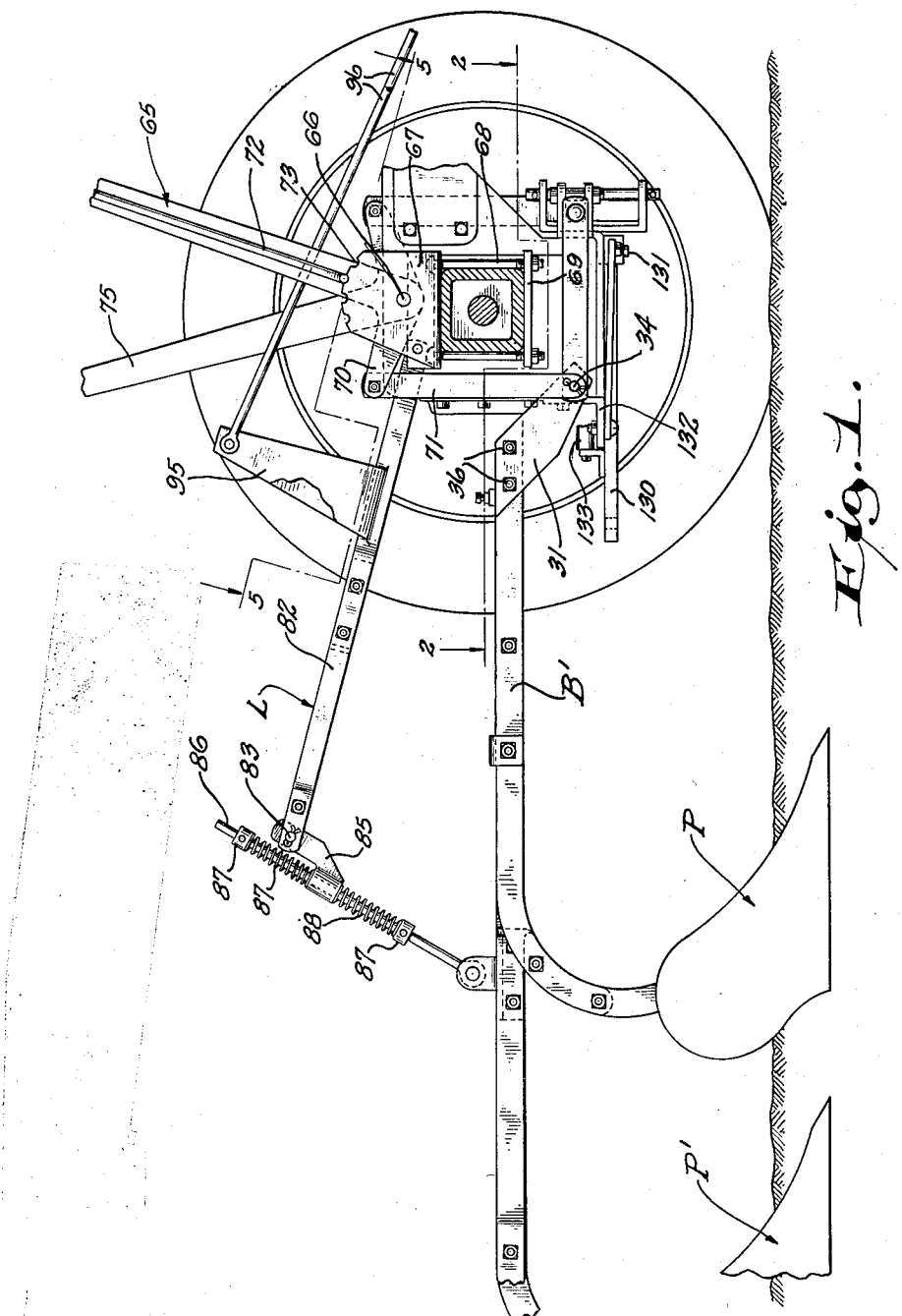
Fig. 1 is a view partly in side elevation and partly in vertical longitudinal cross section showing one form of the invention.

Fig. 6 is a fragmentary view in top plan showing the plows, the plow beams therefor, their braces, portions of their hitches, and the coulter wheel combined with the rearward end of one of the plow beams;

Fig. 7 is a fragmentary view in side elevation illustrating the adjustment provided between one of the hitches and one of the plow beams to take care of side draft;

Fig. 8 is a fragmentary detail view in side elevation showing the plows to which the coulter wheel it attached, and also illustrating the means for its attachment and adjustment;

Fig. 9 is a fragmentary view on an enlarged scale and in rear elevation of portions of the adjustment mechanism shown in Fig. 8; and Fig. 10 is a view in rear elevation of the structure shown in Fig. 8 with parts broken away and shown in section for the sake of illustration.

Referring to the drawings it will be seen that the invention comprises in general a tractor, fragmentarily and diagrammatically illustrated and indicated as a whole at T. Plows designated generally at P and P' trail the tractor. The plows P and P' are attached to plow beams designated generally at B and B'. The plow beams B and B' are connected by hitches or draw bar connections designated generally at H and H' to the tractor, these hitches being so constructed and organized as to apply the draft to the plows and also to provide for leveling, tilting and lifting thereof.

To describe the structure with more particularity, an angle iron 10 is secured by bolts and nuts 11 to the trailing end of the tractor T, as for example, to the transmission housing thereof. The angle iron 10 is elongated in structure and extends transversely with respect to the tractor and its transmission housing, and its ends, as clearly shown in Figs. 2 and 5, project beyond the sides of the portion of the housing to which the angle iron 10 is attached.

Figure 4:
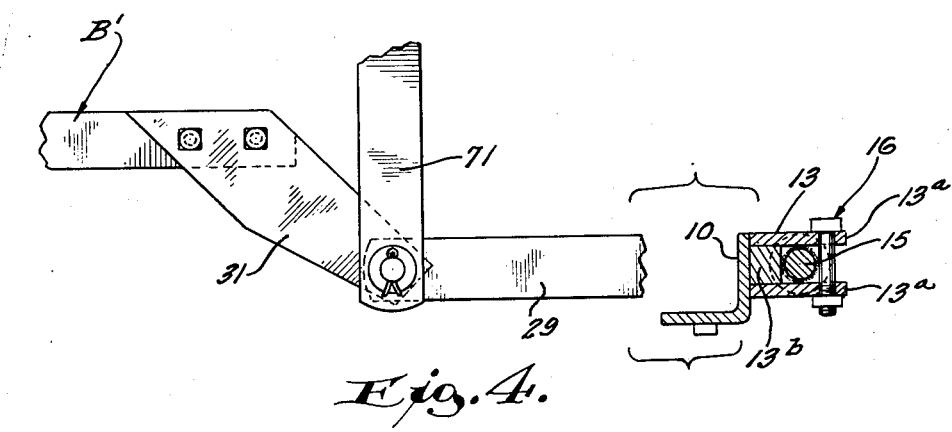
Fig. 4 is a fragmentary sectional view taken on line 4—4 of Fig. 2 and illustrating the bearing provided at the other end of the hitch which functions to apply the draft to its plow beam and yet permits the rotation required for variation in depth, for lift, and also the clearance or sloppy fit permissive of the required corrective tilt.

Bearing brackets 12 and 13 are fixedly secured to the projecting ends of the angle iron 10. These bearing brackets are both of U-shaped construction, both have their body portions welded or otherwise secured to the vertical flange of the angle iron 10, and both have their legs extending forwardly from such flange. While similar in construction, they are, however, of different dimensions and proportions, the bearing bracket 12 being larger than the bearing bracket 13. In general, they are designed and adapted to provide a support for a main shaft 15 and to so support the shaft 15 that it may be rotated about its own axis or may be tilted in approximately the same vertical plane as its longitudinal axis. For these purposes the bearing bracket 13 may be constituted as illustrated in Fig. 4. As is shown, the bracket 13 has its legs 13a and its body 13b made up of separate parts which, of course, are suitably secured together, preferably welded. The bracket structure 13 is completed by a bolt and nut 16 which loosely confines the shaft 15 for rotation and with such a sloppy fit or such clearances as will permit it to be tilted in the vertical plane of its axis.

Figure 3:
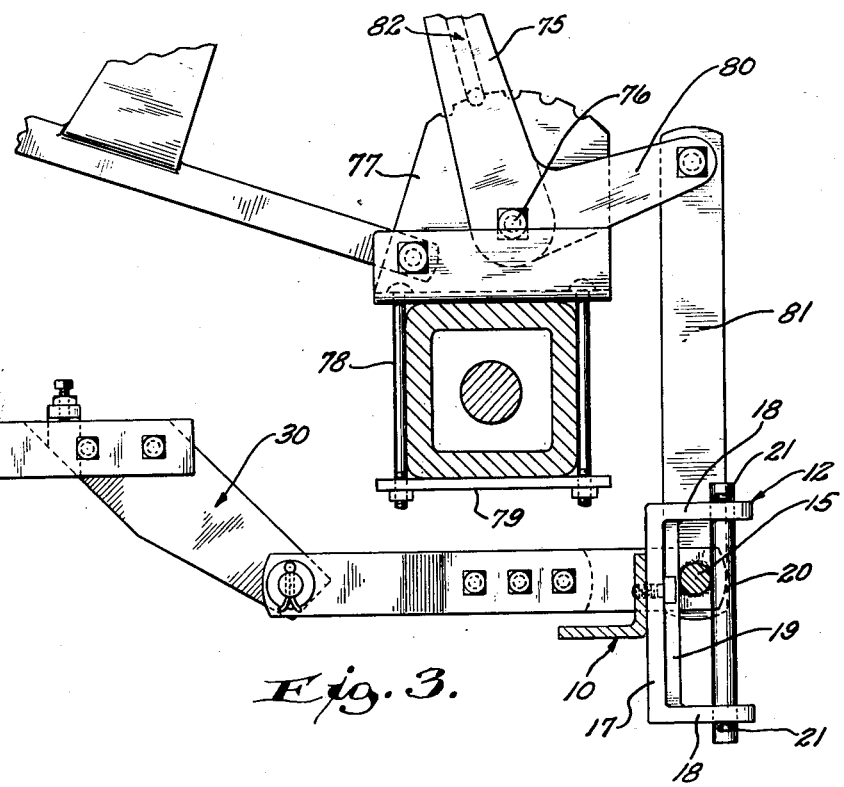
Fig. 3 is a fragmentary view in vertical cross section taken on line 3—3 of Fig. 2 and illustrating especially the provision made for tilting the plows to compensate or correct for the tilt of the tractor incidental to the fact that one wheel thereof rides in the furrow while the other rides on unplowed ground.

The bearing bracket 12 is shown to advantage in Fig. 3. It is of integral construction in that its body portion 17 and its rearwardly projecting legs 18 are all constituted of one piece of metal. A wear plate 19 is applied to the forward side of the body 17 of the bracket 12. As before, the bearing structure afforded by the bracket 12 and its wear plate 19 is completed by a bolt or bar 20, which in this instance, may be held against axial displacement by cotter pins 21.

Figure 2:
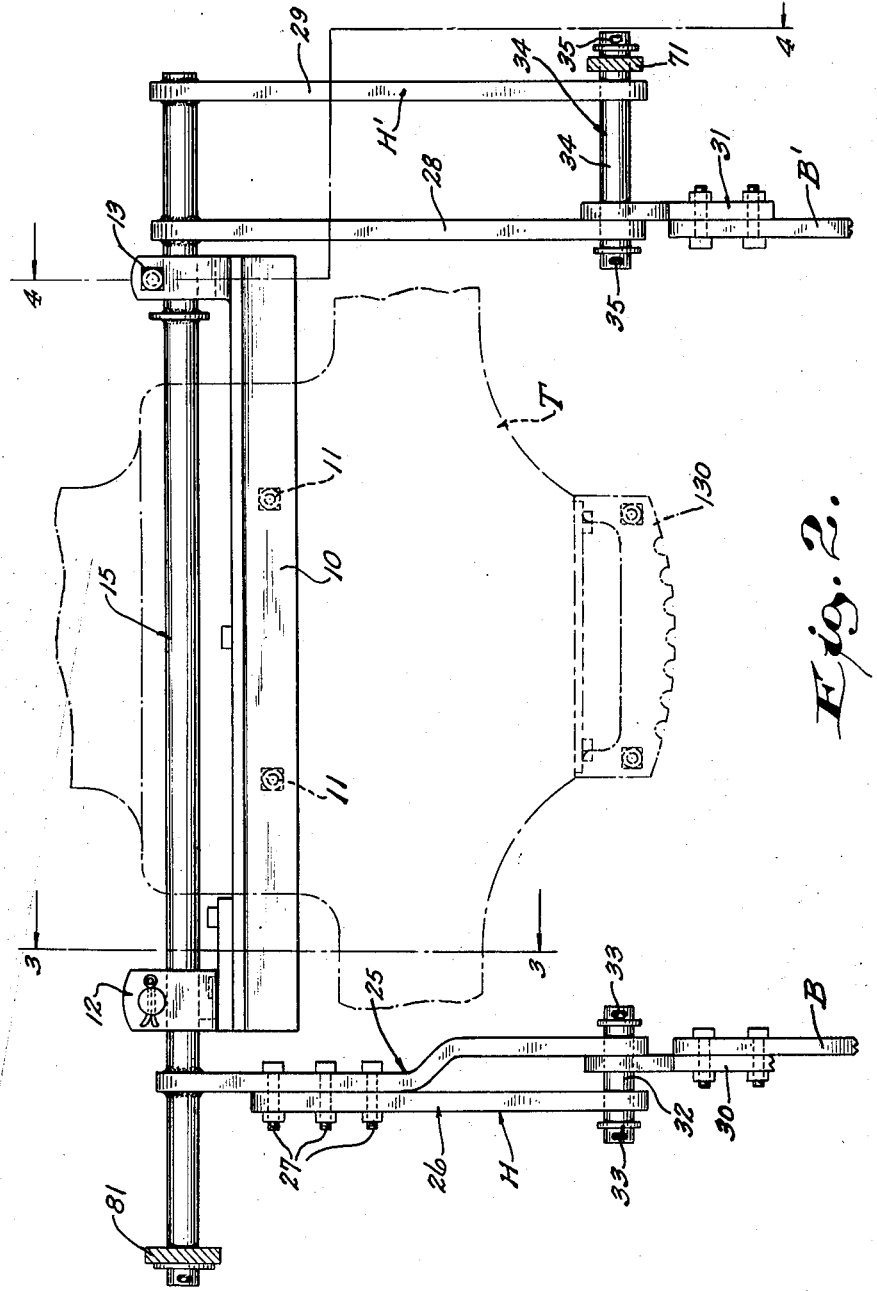
Fig. 2 is a fragmentary sectional view taken on line 2—2 of Fig. 1 and showing the trailing end of the tractor and the way in which the plow beams are hitched thereto.

The shaft 15 is thus supported in the manner described by the bearing brackets 12 and 13 for rotation and for tilting movement and, as will be seen in Figs. 2 and 5, its ends project well beyond the bearing brackets 12 and 13.

The hitch H is attached to the portion of the shaft 15 which projects to the left beyond the bearing bracket 12 as the structure is viewed in Figs. 2 and 5, whereas the hitch H' is attached to the portion of the shaft 15 which projects to the right of the bearing bracket 13 as viewed in Figs. 2 and 5.

While the hitches H and H' are of similar construction they differ in their particular design in order to adapt them to perform their respectively different adjustments. They have, of course, in common the duty or function of applying the draft to their respective plow means.

Each of these hitches is of double barred construction for purposes of ruggedness and strength. The hitch H comprises a bar 25 having its intermediate portion reversely bent so that its rearward end is offset from its forward end. The forward end of bar 25 is rigidly attached to the shaft 15. The other element of the hitch H comprises a straight bar 26 securely bolted as at 27 to the bar 25. Similarly, the hitch H' comprises a pair of bars 28 and 29, each of which, however, is straight, and each of which has its forward end welded or otherwise suitably secured to its projecting end of the shaft 15. The bars 28 and 29 are parallel and are arranged in transversely spaced relation; in fact, their spacing is somewhat greater than the spacing of the spaced portions of the bars 25 and 26 of the hitch H.

Connections are supplied between the rearward ends of the hitches H and H' and their respective plow beams, and while these hitches are, in many respects, similar in construction, they vary, especially in their manner and attachment to the plow beams for the purpose of correcting or compensating side draft. Both such connections comprise metal plates, the metal plate interconnecting the hitch H and the plow beam B being designated generally at 30 (see Figs. 3, 6 and 7) and the metal plate interconnecting the hitch H' and the plow beam B' being designated generally at 31. The plates 30 and 31 are pivotally interconnected with the hitches, this pivotal interconnection being accomplished in the instance of the plate 30 with its hitch H by means of a comparatively short pivot pin 32, (see Fig. 2), cotter pins and washers 33 being provided to prevent axial displacement of the pivot pin 32. A similar though longer pivot pin 34 equipped with suitable cotter pins and washers 35 pivotally connects the plate 31 to the hitch H'.

The plate 31 has its upper and rearward end secured by bolts 36 to its plow beam B' as clearly illustrated in Fig. 1. The plate 30 is adjustably attached to its plow beam B as illustrated in detail in Fig. 7. This adjustment is provided to tilt the plow beams with respect to each other, and this in such a manner that compensation or correction shall be had for the side draft of a tractor pulled plow. For this purpose the plate 30 is pivotally connected by a bolt and nut 37 to the forward end of its plow beam B. The plate 30 may turn about its bolt and nut 37. It is held, however, in various angular adjustments by means of a second nut and bolt 38, the pin of which bolt and nut 38 passes through an arcuate slot 39 in the plate 30 and also, of course, through a bolt hole in the plow beam B. To insure rigidity of adjustment the plate 30 has an integral overlapping ear or lug-like structure 40 equipped with a set screw 41 and lock nut 42 which, when appropriately tightened, insures the selected adjustment.

The plow beam structures B and B' are also similar in nature in that both are constructed of strap iron of suitable gage, the bar of the plow beam B' being designated at 45 and the bar structure of the beam B, which is composite, being inclusive of two bars 46 and 47 (see Fig. 6). This is necessary because the plow P is behind the plow P' and the longer reach is necessary. The bars 46 and 47 are bolted together as indicated at 48 and 49.

The plow beams B and B' are cross braced and this in a special manner. The desired bracing is had by having two braces one designated generally at 50 and the other at 51. The brace 50 comprises simply two metal strips 52 and 53 having their ends lugged and secured to the plow beams B and B'. One of the strips 53 is attached to its plow beam B by the bolt and nut 49 which takes part in securing the bars of the plow beam B together. The other strip 52 is secured to the plow beam B' by a separate bolt and nut 54.

The brace 51 is diagonally arranged. It is also constructed of strap iron and includes a strip 55 having a V-shaped end 56 secured by bolts and nuts 57 to the plow beam B'. The other strip 58 of the brace 51 has its rearward end secured by bolts and nuts 60 to the plow beam B. In both instances the metal strips which constitute the braces may be adjusted lengthwise with respect to each other, and may be fixed in any adjustment by suitable bolts and nuts cooperable with a series of bolt holes provided in the strips and adapted to be brought into the desired registry. In the instance of the brace 50 the bolts and nuts for maintaining the desired adjustment is designated at 61. In the instance of the brace 51 corresponding bolts and nuts are designated at 62.

In order to control the depth at which the plows work, the present invention proposes to combine with the pivotal connection between the plate 31 and the hitch H', a novel form of manually operable adjusting means. This means includes a hand lever or control element 65 (see Fig. 1) in the form of a bell crank, the elbow of which is pivoted as at 66 on a U-shaped bracket 67 secured by bolts and nuts 68, and a clamping plate 69 on the axle housing of the tractor. The short arm 70 of the lever 65 is pivoted to the upper end of a link 71. The lower end of the link 71 is pivotally interconnected with the pivot pin 34 (see also Fig. 2). When the operator rocks the lever 65 he raises and lowers the pivot pin 34. This is the hitch point.

As is well known, the depth of operation of the common type of mold board plow is largely dependent upon the height of the hitch point, the plow finding a level below the surface of the ground dependent upon the height of the hitch. The plow is not pressed down into the ground nor, on the other hand, is it supported, at least to any practical extent, from the drawing vehicle. It seeks its own level and is guided or controlled by the height of the hitch so as to maintain the desired depth of plowing.

As diagrammatically illustrated, the lever 65 is releasably secured in any adjustment by the conventional hand operated detent 72 cooperable with a notched quadrant formed on one of the vertical plates of the bracket 67.

At the opposite side of the machine from the lever 65 is a lever or control element 75 similar in construction to the lever 65, and like the lever 65, fulcrumed by a bolt and nut 76 on a bracket 77, also supported on and secured to the axle housing by bolts and nuts 78 and clamping plates 79. The lever 75, however, has an entirely different function. Its purpose is to tilt the shaft 15 so as to maintain the plow's level, notwithstanding the fact that one wheel of the tractor is riding in the furrow while the other wheel of the tractor is riding on unplowed ground. To accomplish this purpose the short arm 80 of the lever 75 has its forward end pivotally connected to the upper end of a link 81. The lower end of the link 81 is pivotally connected to the shaft 15. The lever 75 is also equipped with a manually releasable and spring engaged detent 82. When the detent of the lever 75 is released and the lever is rocked, the left hand end of shaft 15, as viewed in Figs. 2 and 5, is raised or lowered, depending upon the direction in which the lever 75 is moved. As previously indicated, this tilts the shaft 15 and the bearing 13 permits such tilting. As a consequence, the plows are leveled notwithstanding the tilt of the tractor.

Also combined with the plow beam structure is a lifting mechanism designated generally at L. This mechanism is largely of a conventional construction. It includes a yoke 82 constructed of strap iron (see Fig. 5) and converging to pivotally interconnect as at 83 with a sliding connection 85 interfitted with a supporting rod 86, having collars 87 pinned thereto and having springs 88 interposed between the collars 87 and the sliding connection 85. The lower end of the rod 86 is pivotally interconnected with a pivot pin 89 Fig. 6 mounted in ears 90, fixed to a bracket 91 attached to the brace 51 by the same bolts 62 used for securing the parts of the brace 55 together.

The lift mechanism is largely of conventional construction and needs no further description. It is usually power operated, but as the power means for operating it is no part of the present invention, it is not necessary to illustrate or describe it. It is sufficient to indicate that bracket 95 may be attached to the yoke 82 and connected by suitable rod 96 to the operating mechanism.

One other advantage of the invention is that the spacing of the plows may be adjusted with respect to the construction heretofore described. For example, when it is desired to use plows of a larger size than those shown it is necessary to space the beams a greater distance apart. This may be accomplished as illustrated at dotted lines on Fig. 6 by reversing the relation of the strips of the brace 51 and of the strips or bars that constitute the plow beam B, and re-bolting the strips in their oppositely displaced relation.

The combined land side pressure of the plows P and P' is taken by a tail or colter wheel 100. The tail wheel 100 is journaled in well-known manner on an arm 101 which is connected with beam B by an adjusting mechanism generally designated as 102 Fig. 6. As better seen in Figs. 3, 9 and 10, mechanism 101 comprises a plate 117 having forwardly extending ears 118 and 119 disposed on opposite sides of beam 47. Ear 119 is pivoted on a bolt or the like 120 while ear 118 is slotted at 121 and engaged by a bolt 122 in beam 46. Plate 117 therefore can be tilted forwardly or backwardly when bolts 120 and 122 are loose, and the adjustment can be maintained by tightening the bolts. Such adjustment raises or lowers tail wheel 53.

A plate 123 is clamped against plate 117 by a bolt 124 above which plate 123 and arm 101 may pivot relatively to plate 117 and beam B. In this way, the tilt of wheel 100 may be adjusted. For facilitating the first mentioned adjustment of plate 117, a set screw 125 is threaded in plate 123 and passes through a slot 126 in above mentioned plate 117. Set screw 125 engages beam B thereby providing for a fine or gradual adjustment of plate 117 when bolts 122 and 120 are loose. When the desired adjustment is reached, the bolts are tightened as is well understood.

An extension 127 is fixed with plate 117 and ear 118 and has a set screw 128 bearing against the edge of plate 123 for securing a fine adjustment of the latter when bolt 124 is loosened. Shifting of plate 123 is possible because of the slot 126 in plate 117. A lock nut 129 is provided on screw 128 to hold the adjustment. With this mechanism, tail wheel 100 may be readily adjusted to run in the furrow and carry the weight of plows P and P' as well as the landside pressure.

Tractor T is equipped with a drawbar 130 of suitable or well known construction, in the present instance pivoted on a pin 131 and guided for swinging movement on a plate 132 by means of a roller 133. Plate 132 is suitably braced. At times it is desired to use the tractor for pulling a load connected to draw bar 130, perhaps for short periods during the plowing season. Obviously, beam structure B and B' would interfere with such use. However, the interferring structure may be removed very readily. With the removal of a few connections, the tractor may be driven away from the lifting mechanism L and beams B and B' leaving levers 65 and 75 and their connections, and rods 96 in place on the tractor. It is to be noted that these parts do not interfere in any way with the use of draw bar 130 nor with numerous other uses for which the tractor might be needed for a short time. Of course, the mentioned parts can be replaced just as readily when it is desired to continue plowing. When the plowing season is over, shaft 15 and lifting mechanism L are readily removed. Since cross bar 10 and its functionally associated parts do not encumber the tractor, nor interfere in any manner with any use to which it may be put, these members may remain permanently attached to the tractor.

While we have shown and described one construction in which the invention may be advantageously embodied, it is to be understood that the construction shown has been selected merely for the purpose of illustration or example, and that various changes in the size, shape, and arrangement of the parts may be made without departing from the spirit of the invention or the scope of the subjoined claims.

What we claim is:

1. In a tractor hitched plow for use with a tractor having a rear axle, the combination comprising a cross member secured to the trailing end of the tractor and projecting beyond the sides thereof forwardly of said rear axle, a main shaft, bearing brackets fixed to the end portions of said cross member, a bearing in one of said brackets in which the main shaft is supported for rotation the other bearing bracket having means coacting with the main shaft to constrain it to rotation and to vertical movement in the plane of the longitudinal axis of the shaft and about said bearing as a fulcrum, bar-like hitches having their forward ends rigidly connected to the main shaft and extending therefrom to a point rearwardly of said rear axle, plow beams extending rearwardly from the bar-like hitches, plows carried by said plow beams, connecting plates fastened to the forward ends of the plow beams and pivotally connected to the rearward ends of the hitches to provide the hitch point of the plows, a control lever operatively interconnected with one of said pivotal connections and adjustable to raise and lower the hitch point of the plows to regulate the depth of operation of the plows and a second control lever operatively interconnected with the end portion of the main shaft that is supported for rotation and for vertical movement and adjustable to tilt the main shaft and consequently the plows to compensate for tilting of the tractor.

2. In a tractor hitched plow for use with a tractor having a rear axle, the combination comprising a main shaft disposed transversely of the tractor, bearings carried at the sides of the tractor toward the rear thereof but forwardly of said rear axle for supporting said shaft for rocking about its longitudinal axis, one of said bearings being adapted to provide for up-and-down tilting of the shaft in the plane of its longitudinal axis and the other of said bearings being adapted to provide also for substantially vertical displacement of said shaft, hitches extending rearwardly from said shaft in rigid relation thereto to points rearwardly of said rear axle, plow beams having pivotal connections, rearwardly of said rear axle, with and extending rearwardly from said hitches, plows on said beams, a control element operatively interconnected with one of said pivotal connections and adjustable to rock the associated hitch and said shaft to regulate the height of the hitch points of said beams and accordingly the depth of operation of said plows, and a second control element operatively interconnected with said shaft to tilt the same and consequently the plows to compensate for tilting of the tractor.

3. In a tractor hitched plow for use with a tractor having a rear axle, the combination comprising a main shaft disposed transversely of the tractor, bearings at the sides of the tractor forwardly of said rear axle for supporting said shaft for rocking about its longitudinal axis, one of said bearings being adapted to provide for up-and-down tilting of the shaft in the plane of its longitudinal axis and the other of said bearings being adapted to provide for substantially vertical displacement of said shaft, hitches extending rearwardly from said shaft in rigid relation thereto to points rearwardly of said rear axle, plow beams having pivotal connections, rearwardly of said rear axle, with and extending rearwardly from said hitches, plows on said beams, a control element operatively connected to rock said shaft to regulate the height of the hitch points of said beams and accordingly the depth of operation of said plows, and a second control element operatively interconnected with said shaft to tilt the same and consequently the plows to compensate for tilting of the tractor.

4. In a tractor hitched plow for use with a tractor having a rear axle, the combination comprising a main shaft disposed transversely of the tractor, bearings carried at the sides of the tractor toward the rear thereof but forwardly of the rear axle for supporting said shaft for rocking about its longitudinal axis, one of said bearings being adapted to provide for up-and-down tilting of the shaft in the plane of its longitudinal axis and the other of said bearings being adapted to provide also for substantially vertical displacement of said shaft, hitches extending rearwardly from said shaft in rigid relation thereto to points rearwardly of said rear axle, plow beams having pivotal connections, rearwardly of said rear axle, with and extending rearwardly from said hitches, plows on said beams, and a control element operatively inter-connected with said shaft to tilt the same and consequently the plows to compensate for tilting of the tractor.

5. In a tractor hitched plow for use with a tractor having a rear axle, the combination comprising a main shaft disposed transversely of the tractor, bearings carried at the sides of the tractor toward the rear thereof but forwardly of said rear axle for supporting said shaft for rocking about its longitudinal axis, one of said bearings being adapted to provide for up-and-down tilting of the shaft in the plane of its longitudinal axis and the other of said bearings being adapted to provide also for substantially vertical displacement of said shaft, hitches extending rearwardly from said shaft in rigid relation thereto to points rearwardly of said rear axle, interconnected plow beams extending rearwardly from said hitches, plows on said beams, a connecting plate pivoted to one of the rearwardly extending hitches, means pivotally connecting said plate to one of the plow beams, rearwardly of said rear axle, in vertically offset position, releasable means for securing said plate to said beam in various pivotal adjustments with respect to said beam for forward and backward adjustment of said beam for causing lateral swinging adjustment of the alignment of said beams and tractor, a control element operatively interconnected with one of said pivotal connections and adjustable to rock the associated hitch and said shaft to regulate the height of the hitch points of said beams and accordingly the depth of operation of said plows, and a second control element operatively interconnected with said shaft to tilt the same and consequently the plows to compensate for tilting of the tractor.

6. In a tractor hitched plow for use with a tractor having a rear axle, the combination comprising a main shaft disposed transversely of the tractor, bearings carried at the sides of the tractor toward the rear thereof but forwardly of said rear axle for supporting said shaft for rocking about its longitudinal axis, one of said bearings being adapted to provide for up-and-down tilting of the shaft in the plane of its longitudinal axis and the other of said bearings being adapted to provide also for substantially vertical displacement of said shaft, hitches extending rearwardly from said shaft in rigid relation thereto to points rearwardly of said rear axle, interconnected plow beams extending rearwardly from said hitches, plows on said beams, one of said plow beams having a pivotal connection to one of said rearwardly extending hitches rearwardly of said rear axle, a connecting plate pivotally connected to the other rearwardly extending hitch rearwardly of said rear axle, means shiftably connecting said plate to the other of said beams, releasable means for securing said plate to said beam in various positions of adjustment with respect to said beam for forward and backward adjustment of said beam for causing lateral swinging adjustment of the alignment of said beams and tractor, and a control element operatively interconnected with said shaft to tilt the same and consequently the plows to compensate for tilting of the tractor.

MILTON T. HEDQUIST.
DAVID D. MAYHEW.
ACHIEL VAN DE SAMPEL.
ARTHUR J. WHALEN.

REFERENCES CITED

The following references are of record in the file of this patent:

UNITED STATES PATENTS

| Number | Name | Date |
| --- | --- | --- |
| 1,043,246 | Olson | Nov. 5, 1912 |
| 1,378,842 | Dittbrenner | May 24, 1921 |
| 1,526,972 | Ferguson | Feb. 17, 1925 |
| 1,745,472 | Brown et al. | Feb. 4, 1930 |
| 1,786,591 | Anderson | Dec. 30, 1930 |
| 1,831,997 | Brown | Nov. 17, 1931 |
| 2,179,526 | Strandlund | Nov. 14, 1939 |
| 2,222,115 | Mott | Nov. 19, 1940 |
| 2,354,084 | Geraldson | July 18, 1944 |
| 2,357,847 | Ray | Sept. 12, 1944 |
| 2,438,625 | Strandlund | Mar. 30, 1948 |

FOREIGN PATENTS

| Number | Country | Date |
| --- | --- | --- |
| 46,728 | Sweden | Mar. 24, 1920 |